United States Patent Office 3,067,653
Patented Dec. 11, 1962

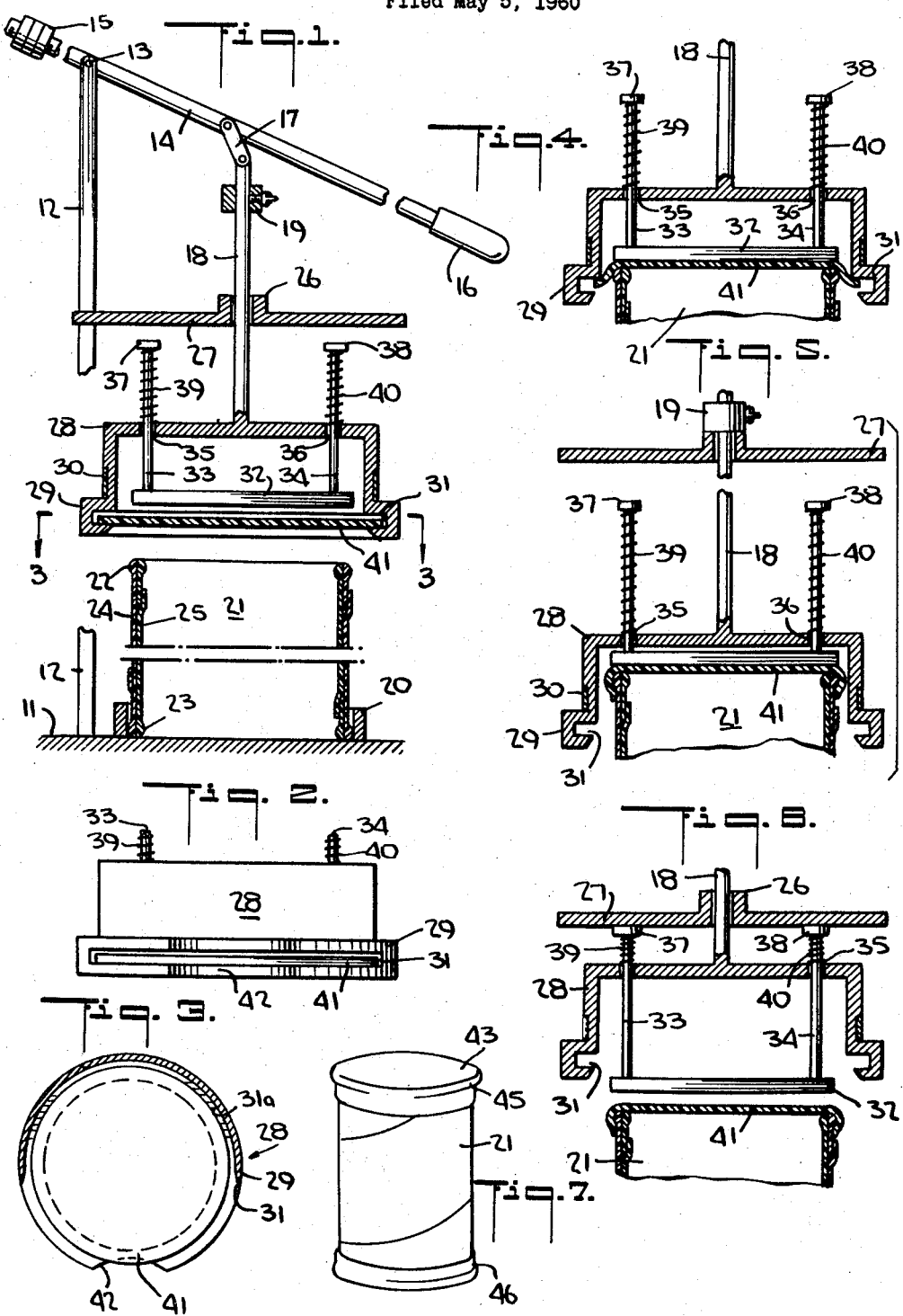

3,067,653
APPARATUS FOR CLOSING CONTAINERS
Mortimer Lesser, and Michael Moncada, both % General Clarifier Corp., 841 E. 43rd St., Brooklyn 3, N.Y.
Filed May 5, 1960, Ser. No. 27,014
1 Claim. (Cl. 93—39.1)

The present invention relates to the production of containers and closures therefor and apparatus for the production thereof.

It is an object of the present invention to provide novel container closures conforming to the container mouth.

Another object of the invention is to provide a simple apparatus which can be actuated manually or automatically to produce the novel closures.

Still another object is to provide a closure-forming apparatus especially adapted to operate upon expanded or cellular thermoplastic sheet material.

A further object is to provide a container closing apparatus especially suited for closing thin-walled relatively weak containers which may be beaded, straight-walled or tapered.

Another object of the invention is to provide a process for closing containers with thermoplastic closures.

These and other objects are realized in accordance with the present invention wherein a thermoplastic sheet or disc of sufficient strength to be self-supporting is placed over the mouth of a container. The disc extends beyond the container and the extending annular-shaped portion is heated or otherwise rendered sufficiently weak so as no longer to be self-supporting. Accordingly the portion falls about the outside of the container, conforming exactly thereto. Upon cooling, the previously heated portion is set into its new configuration.

The temperature of heating of course should not be so high as to destroy the thermoplastic material. On the other hand it should be sufficiently high to allow deformation and preferably should be sufficiently high so as to produce shrinkage of the plastic which results in a neater closure, particularly at the lower edge. The exact magnitude of the temperature will depend upon the plastic, its thickness, the width of the portion heated, and the like. Where the thermoplastic material is a poor heat conductor, it is often desirable to heat its periphery both from above and below. The best temperature under any particular set of conditions can easily be determined by a few trials. The shrinkage of the heated portion produces a snug fit of the closure about the container even if the container is not absolutely cylindrical such as when the mouth has a bead about it or is undercut, e.g. the container is wider at its mouth than therebelow.

The preferred thermoplastic material for the closure blanks which are formed into closures by the present invention is expanded or cellular sheet material, since it is of light weight and shrinks readily when heated to appropriate temperature. Moreover, the cellular structure is a heat insulator so that heat applied to the rim will not be transferred to areas where not desired. The blanks are desirably formed by stamping from large sheets of expanded polystyrene although other thermoplastics such as nylon, polyesters, cellulose esters, cellulose ethers and polymers and/or copolymers of olefins, e.g. ethylene or propylene, vinyls, e.g. vinyl chloride, vinyl acetate, methyl methacrylate or acrylonitrile, vinylidene chloride, etc., may be used, whether in cellular form or in more conventional film form. While the disc thickness may vary, when formed of one or more layers of expanded polystyrene sheet material each layer generally ranges from about 6 to 30 mils and preferably ranges from about 10 to 15 mils in thickness.

The foregoing method can be carried out with any containers having a mouth surrounded by a more or less tubular portion such as glass jars, metal cans, heavy cardboard or plastic tubes, etc. The container being closed carries little more than the weight of the closure blank, as contrasted with a drawing operation where the container wall bears a considerable load; as a result the novel process is especially suited for use with thin-walled containers which cannot bear any appreciable compressive loads and/or cannot readily be closed by turning a bead. Excellent results have been achieved employing tubes of expanded thermoplastic material so that the entire container will be composed of light weight insulating material; both ends of such tubes can be closed similarly, with an intermediate filling operation. The tubes may be formed by laminating two or more tubes each produced by helical winding of relatively narrow strips of sheet material of the same type as the closure blank. The container can also comprise a drinking glass, provided with a beaded edge, in which a food item such as jelly is packed. The beaded edge will produce a corresponding bead in the contour of the closure which will thereby produce a snap-locking action in removal and replacement. The ability to remove and replace the cover without damage will be aided by its expansible nature, to which a cellular structure contributes. Obviously if the container wall is also expansible re-use of the closure is further facilitated. Where desired, the bead near the mouth of the container, which bead may be continuous or discontinuous, can be produced by molding or by application of pressure and heat. Where the container is thermoplastic it can be produced by pressing the mouth against a hot plate. Another system which has proven satisfactory involves cutting tubular containers from very long tubes, using hot wires as the cutting members. Whether or not a bead will form, and its nature, will be determined by the temperature, speed and gauge of the cutting wires.

Even if the container does not have a bead about which the closure is formed, a snap-locking action can be achieved if the container is tapered downwardly. If the container wall is perfectly straight over that portion acted upon by the closure blank in becoming a closure, a snap-locking action will not result, although the container closure will be more easily removed and replaced. If a seal is desired, however, it can be effected in several ways. Some thermoplastic sheet materials under the conditions of heating become sufficiently tacky so that when they droop and take the container shape they will adhere thereto. An alternate way is to apply an adhesive to the container wall where it will be contacted by the closure as it forms. The material applied may become adhesive due to heating, as when the annular portion of the closure blank is being heated. Still another possibility is to apply a latex such as polyvinyl acetate latex to the upper portion of the container, the heat from the closure blank helping remove the water from the latex and helping to set the polyvinyl acetate adhesive which is completed only after the closure has been formed.

While the process so far described can be performed more or less manually, in the interests of economy and efficiency it is advantageously effected mechanically. One suitable apparatus is illustrated in the accompanying drawing, wherein:

FIG. 1 is a longitudinal sectional view through the apparatus very shortly after a cycle has begun;

FIG. 2 is an elevation of a portion of the apparatus of FIG. 1;

FIG. 3 is a section along line 3—3 of FIG. 1;

FIGS. 4, 5 and 6 are longitudinal sectional views through the apparatus at successive stages subsequent to FIG. 1; and, FIG. 7 is a perspective view of a closed container produced in accordance with the invention.

To the worktable 11, shown in FIG. 1, there is attached a vertical stanchion 12 to which at 13 there is pivoted an operating lever 14. One end of lever 14 is threaded and carries displaceable counterweights 15 whose positions can be varied almost to achieve balance about pivot 13. The other end of lever 14 terminates in a grip 16 by means of which the lever is manually operated. A connecting rod or link 17 is pivoted at one end to lever 14, between pivot 13 and grip 16, and at its other end to a rod 18 carrying a collar 19 with a set screw to limit the downward stroke of rod 18 relative to the worktable 11 in a manner later to be described. Because of the link 17, rod 18 can move vertically upon rotational movement of grip 16 about pivot 13. Centered below rod 18 on worktable 11 is a guide 20 to hold a tube 21, pushed thereagainst, in approximately correct position for being worked upon. If the tube 21 and/or the guide 20 is made of a resilient material, this resilience may be taken advantage of to ensure proper positioning of the tube. The tube 21 is cylindrical except for beads 22 and 23 at opposite ends, and is made up of two plies 24 and 25 of spirally wound expanded polystyrene sheet material, the plies being glued to one another.

The rod 18 projects downwardly from link 17 through a sleeve 26 about an aperture in a plate 27 secured, preferably adjustably, to stanchion 12. Sleeve 26 serves as a guide for rod 18 and a limiting abutment for collar 19. The rod 18 at its lower end carries a cylindrical die 28 including a flange 29. Above the flange on the outside of die 28 is an annular heating element 30. The inside of die 28 is slightly greater in diameter than the outside of tube 21, although this difference has been exaggerated in the drawing. The inside of the die is flared outwardly in downward direction. A slot 31 extends through the flange 29 (FIG. 3) over about half the die periphery, the slot merging into an annular groove, 31a, in the inside wall of the flange. A lightweight knockout element 32 is supported at a level slightly above the top of slot 31 and is preferably water cooled (not shown) to prevent softening and/or shrinkage of the central portion of the material to be acted upon, described more fully hereinafter. The knockout is supported by several rods two of which are shown at 33, 34, projecting through apertures 35, 36 in die 28, and terminating in enlargements 37, 38 slightly below plate 27. A spring 39 coiled about rod 33 bears at one end against enlargement 37 and at the other on the top of die 28 while another spring 40 is similarly situated relative to rod 34. Thus knockout 32 is actually suspended from die 28 by springs 39 and 40, the stiffness of these springs serving to hold knockout 32 at the desired level relative to slot 31.

As can be seen in FIGS. 2 and 3, the slot 31 extends fully through flange 29 at the front of the die 28 so as to permit insertion of a closure blank 41 all the way into the groove 31a. An arcuate depression 42 in the front of flange 29 facilitates insertion of the blank 41 into the groove. (The depression 42 could be provided only in that portion of the flange 29 above slot 31 with no change in function.)

In operation, with a closure blank 41 so held by the die 28, the grip 16 is moved down, lowering rod 18 and die 28 until blank 41 comes to rest on the top of tube 21. Blank 41 now rests against the top of slot 31 and groove 31a. Tube 21 carries the weight of blank 41 plus that of knockout 32 plus that of die 28 minus, however, the weight of the counterweight which is almost equal to die 28; thus, even if tube 21 is very thin-walled it will not fail. Heat from element 30 is transmitted to flange 29 and softens the periphery of blank 41 both from above and below. The insulating character of the blank and cooling by knockout 32 localize the heating of blank 41.

Under the influence of the heat and the weight of die 28 the peripheral portion of blank 41 is softened to the extent that it no longer supports itself, and 28 begins falling as shown in FIG. 4. Knockout 32 rests on the center of blank 41.

Die 28 continues to fall until it reaches the position shown in FIG. 5 where it can fall no further, being limited by collar 19 and sleeve 26. At this stage the peripheral portion of blank 41 is no longer in slot 31 and groove 31a. Instead it has fallen about the top of tube 21 and has shrunk thereabout to take the configuration of the tube, including the bead 22. The capped tube 21 is now ready to be withdrawn. It will be noted that there is no question whether the heating has been at the right temperature or for the proper time. If the die 28 has dropped, it is ready to be raised.

To free the tube 21 grip 16 is raised, carrying rod 18 upward along with lever 14. Die 28 is thereby raised. Often the capped tube 21 will be carried upward with the die because of their close fit. If so, as the knockout 32 rises the enlargements 37, 38 will be limited by plate 27 from further upward movement. Thus die 28 will continue to move upward compressing springs 39, 40 and freeing tube 21 (FIG. 6). The tube is removed and the apparatus is now ready for the next cycle.

The capped tube 21 after removal is inverted and filled, as with ice cream or the like, and then the capping procedure is repeated on the open end. The end product, shown in FIG. 7, comprises tube 21 capped at opposite ends by closures 43 and 44 each including an annular bead, 45 and 46 respectively, corresponding to a similar bead on the ends of the tube 21.

Since the shaping member for each closure is precisely that tube which will be capped by the closure, there is absolute certainty that the tube and closure will conform irrespective of any irregularities or imperfections in the tube. The invention is applicable not only to round containers but also to oval and even to containers having edges, such as square or hexagonal containers. Of course the die and closure blanks will be correspondingly shaped.

The vertical movements of rod 18 have been described as manually actuated. They can be effected mechanically or electromagnetically, however, being actuated by the position of die 28, knockout 32, etc. relative to microswitches or the like. Alternatively, the movements of rod 18 can be cam controlled. For example, rod 18 can be supported by a roller riding on a cam track which is rotated above the worktable so that the roller and rod 18 are moved up and down in accordance with a preselected program.

It will of course be understood that various details may be varied through a wide range without departing from the principles of this invention and it is therefore intended that obvious departures and modifications be embraced by the annexed claim.

Having thus described our invention, what we claim is:

An apparatus for forming from a blank of thermoplastic self-supporting sheet material a closure for a tubular container, comprising guide means for holding said container in predetermined position, a tubular die conforming to and positioned above said container, said die being provided with an annular groove on about half its inside and with a slot affording access to said groove from the outside whereby said blank can be inserted into said groove through said slot, the outside of said die immediately adjacent said slot being provided with a depression to facilitate seating of said blank in said groove, annular heating means for heating the periphery of said blank in said groove and said slot, a cooled knockout disposed within said die, at least one rod connected with said knockout and projecting displaceably through the top of said die, spring means between said die and knockout and normally supporting the latter at a level slightly above the top of said groove and said slot, a knockout plate adjustably positioned above said rod, and means for raising and lowering said die relative to said knockout plate and said container.

References Cited in the file of this patent

UNITED STATES PATENTS

| 2,447,690 | Ekstedt | Aug. 24, 1948 |
| 2,576,446 | Condon | Nov. 27, 1951 |
| 2,584,718 | Laabs | Feb. 5, 1952 |
| 2,885,105 | Heyl | May 5, 1959 |
| 2,940,654 | Easter | June 14, 1960 |
| 2,947,463 | Conklin | Aug. 2, 1960 |
| 2,976,655 | Dreyfus et al. | Mar. 28, 1961 |